(12) United States Patent
Le Normand et al.

(10) Patent No.: US 11,110,695 B2
(45) Date of Patent: *Sep. 7, 2021

(54) MARKING TAPE, METHOD OF APPLYING AND METHOD OF MANUFACTURING THE MARKING TAPE

(71) Applicant: 3M INNOVATIVE PROPERTIES COMPANY, St. Paul, MN (US)

(72) Inventors: Jean Le Normand, Versailles (FR); Volker Boehme, Rheinberg (DE); Michael R. Jost, Neuss (DE); Dirk Kolowrot, Korschenbroich (DE); Sabine Henning, Moenchengladbach (DE)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 856 days.

This patent is subject to a terminal disclaimer.

(21) Appl. No.: 14/404,265

(22) PCT Filed: May 30, 2013

(86) PCT No.: PCT/US2013/043235
§ 371 (c)(1),
(2) Date: Nov. 26, 2014

(87) PCT Pub. No.: WO2013/181325
PCT Pub. Date: Dec. 5, 2013

(65) Prior Publication Data
US 2015/0144257 A1 May 28, 2015

(30) Foreign Application Priority Data
May 30, 2012 (EP) .................................... 12170061

(51) Int. Cl.
*B32B 38/00* (2006.01)
*E01F 9/506* (2016.01)
(Continued)

(52) U.S. Cl.
CPC .......... *B32B 38/0012* (2013.01); *B32B 5/022* (2013.01); *B32B 5/028* (2013.01);
(Continued)

(58) Field of Classification Search
CPC ...... B32B 38/0012; B32B 5/022; B32B 5/028
See application file for complete search history.

(56) References Cited

U.S. PATENT DOCUMENTS

| RE24,906 E | 12/1960 | Ulrich |
| 3,451,537 A | 6/1969 | Freeman |

(Continued)

FOREIGN PATENT DOCUMENTS

| BR | 8107486 | 3/1983 |
| CN | 101875823 | 11/2010 |

(Continued)

OTHER PUBLICATIONS

International Search Report for PCT International Application No. PCT/US2013/043235 dated Nov. 14, 2013, 8 pages.

(Continued)

*Primary Examiner* — Barbara J Musser
(74) *Attorney, Agent, or Firm* — Carlos M. Téllez Rodriguez; 3M Innovative Properties Company

(57) ABSTRACT

A marking tape for application on pavement which comprises a core layer and an adhesive layer outside the core layer. The core layer is formed of a combination of a conforming layer of a thermoplastic material, a marking layer of a cross-linked material, and a fibrous layer. The (Continued)

conforming layer and the marking layer are contiguous and/or directly interconnected with each other.

12 Claims, 4 Drawing Sheets

(51) Int. Cl.
    *E01F 9/576* (2016.01)
    *E01F 9/588* (2016.01)
    *B32B 7/12* (2006.01)
    *B32B 5/26* (2006.01)
    *B32B 5/28* (2006.01)
    *B32B 5/02* (2006.01)
    *B32B 37/15* (2006.01)

(52) U.S. Cl.
    CPC ............... *B32B 5/26* (2013.01); *B32B 5/28* (2013.01); *B32B 7/12* (2013.01); *B32B 37/153* (2013.01); *E01F 9/506* (2016.02); *E01F 9/578* (2016.02); *E01F 9/588* (2016.02); *B32B 2405/00* (2013.01); *Y10T 156/10* (2015.01); *Y10T 156/1039* (2015.01); *Y10T 428/24612* (2015.01); *Y10T 428/2848* (2015.01); *Y10T 442/10* (2015.04); *Y10T 442/674* (2015.04)

(56) References Cited

U.S. PATENT DOCUMENTS

| | | | |
|---|---|---|---|
| 3,770,559 | A | 11/1973 | Jackson |
| 3,879,148 | A | 4/1975 | Eigenmann |
| 4,146,635 | A * | 3/1979 | Eigenmann ......... E01C 23/0885 404/12 |
| 4,443,510 | A | 4/1984 | Watt |
| 4,925,335 | A | 5/1990 | Eigenmann |
| 5,194,113 | A * | 3/1993 | Lasch .................... E01F 9/512 156/243 |
| 5,536,569 | A | 7/1996 | Lasch |
| 5,679,437 | A | 10/1997 | Hackworth |
| 5,981,033 | A * | 11/1999 | Haunschild ............ E01F 9/512 404/12 |
| 2003/0139107 | A1 | 7/2003 | Attar |
| 2004/0103988 | A1 | 6/2004 | Wiley |
| 2007/0110960 | A1 | 5/2007 | Frey |
| 2008/0280034 | A1 | 11/2008 | Mathis |
| 2009/0098338 | A1 | 4/2009 | Frey |
| 2009/0098999 | A1 | 4/2009 | Frey |
| 2010/0055374 | A1 | 3/2010 | Greer |
| 2010/0076128 | A1 | 3/2010 | Abhari |
| 2010/0221419 | A1 | 9/2010 | Frey |
| 2011/0305901 | A1 | 12/2011 | Wyse |
| 2012/0035046 | A1 | 2/2012 | Rosenflanz |

FOREIGN PATENT DOCUMENTS

| | | |
|---|---|---|
| DE | 2716827 | 10/1977 |
| EP | 0037211 | 10/1981 |
| EP | 101084 | 2/1984 |
| EP | 213338 | 3/1987 |
| EP | 304405 | 2/1989 |
| FR | 2040574 | 1/1971 |
| GB | 1230097 | 4/1971 |
| GB | 1465585 | 2/1977 |
| KR | 100978213 | 8/2010 |
| NL | 1004432 | 5/1996 |
| WO | WO 1992-11333 | 7/1992 |
| WO | WO 1993-17188 | 9/1993 |
| WO | WO 1995-08426 | 3/1995 |
| WO | WO 1998-23818 | 6/1998 |
| WO | WO 1998-28133 | 7/1998 |
| WO | WO 1998-40562 | 9/1998 |
| WO | WO 1999-03642 | 1/1999 |
| WO | WO 1999-04098 | 1/1999 |
| WO | WO 1999-16845 | 4/1999 |
| WO | WO 1999-046447 | 9/1999 |
| WO | WO 2003-027395 | 4/2003 |
| WO | WO 2003-029377 | 4/2003 |
| WO | WO 2009-085550 | 7/2009 |
| WO | WO 2011-022021 | 2/2011 |
| WO | WO 2011-022022 | 2/2011 |

OTHER PUBLICATIONS

Office Action from U.S. Appl. No. 16/351,162, dated Sep. 25, 2020.

* cited by examiner

MARKING TAPE, METHOD OF APPLYING AND METHOD OF MANUFACTURING THE MARKING TAPE

CROSS REFERENCE TO RELATED APPLICATIONS

This application is a national stage filing under 35 U.S.C. 371 of PCT/US2013/043235, filed May 30, 2013, which claims priority to European Application No. 12170061.1, filed May 30, 2012, the disclosures of which are incorporated by reference in their entirety herein.

FIELD OF THE INVENTION

The invention relates to a marking tape for application on pavement, a method of applying the marking tape on pavement and a method of manufacturing the marking tape. The invention relates particularly to a pre-manufactured marking tape which can be retained on the pavement by an adhesive and which has a fibrous layer.

BACKGROUND ART

Marking tapes for pavement marking are typically used to delineate traffic lanes on a roadway. Such a marking tape may extend continuously, such as along the outermost boundaries of the driving lanes, or intermittently, such as between lanes.

Marking tapes are typically pre-manufactured and provided on rolls from which they can be removed and applied on the pavement by simply rolling the tape onto the pavement surface. Thus such marking tapes by principle differentiate from markings which are directly created on the pavement, for example by spraying, casting or painting. Available rolls may provide marking tape in lengths of 25 to 300 meters, for example. The length of the marking tape on a roll depends for example on the width, thickness of the tape and the materials used in the tape. The thickness of the marking tape as referred to in this specification corresponds to a measure in a dimension the tape would protrude from a surface on which it is applied in its intended orientation. This is typically the smallest dimension of the tape, whereas the width corresponds to measure in a dimension perpendicular to the length and the thickness.

While both types of markings have advantages a popular use of marking tapes is in construction work zones, where the marking tape is used to temporarily guide the traffic on the roadway around work areas. Accordingly the marking tape is often removed from the roadway after a period of time. However there are also applications in which marking tape is used for permanent marking of roadways. To allow the marking tape to be peeled from the surface of the roadway in a single piece, the marking tape desirably has sufficient structural integrity to prevent tearing. Further if the tape is intended to remain in place longer term, it is desirable to provide the tape with structural integrity sufficient to withstand the mechanical stress that vehicles and weather can cause.

Various pavement marking tapes have been developed, and some of such tapes include a fibrous layer.

U.S. Pat. No. 4,146,635 discloses a multi-layer surface marking tape material for use on roadway pavements, and having an anti-skid and wear-resisting upper layer and a lower primer layer for connecting the material to said pavement. The primer may be a bituminous thermoplastic layer allowing for detaching the tape from the road pavement by a heated blade tool. The multi-layer tape material comprises further an intermediate layer connected to the lower layer and the upper layer. The intermediate layer in one embodiment consists of a resin impregnated nonwoven fibrous structure.

US 2011/0305901 discloses marking tape which includes a fibrous, nonwoven base material having a first side and a second side opposite the first side. A seal coat saturates a portion of the fibrous, nonwoven base material and provides a relatively non-porous coat surface. A carrier coat is applied to the coat surface, and a reflective material is applied to the carrier coat. The relatively non-porous coat surface is adapted to help prevent movement of the reflective material into the fibrous, nonwoven base material. An adhesive is applied to the second side.

WO-A-95/08426 discloses a conformable pavement marking comprising an upper sheet and a base sheet, wherein the base layer comprises a fibrous scrim, a tie layer, and a conformance layer, the tie layer material impregnating the lower portion of the scrim, and material of the upper sheet impregnating the upper portion of the scrim U.S. Pat. No. 5,679,437 discloses a marking tape including a top layer of pigmented vinyl paint with reflective glass beads incorporated therein applied to an intermediate backing layer of either aluminum or vinyl. The backing layer is then laminated to a polyester mesh reinforcement layer, and a pressure-sensitive adhesive hot melt is applied to the under side surface of the mesh for attachment to the roadway surface.

Although a variety of marking tapes exist there is still a desire for a marking tape which is relatively durable, which stays generally in place under typical traffic and weather conditions and which maintains good optical appearance over a long term. Desirably such marking tape is further relatively lightweight and inexpensive.

SUMMARY OF THE INVENTION

In one aspect the invention relates to a marking tape for application on pavement. The marking tape comprises a core layer and an adhesive layer (preferably outside the core layer). The adhesive layer is adapted for retaining the marking tape on the pavement. Further the core layer is formed of a combination of a conforming layer of a, preferably non bituminous, thermoplastic material, a marking layer of a cross-linked material, and a fibrous layer. The conforming layer and the marking layer are preferably in contact with each other over at least a portion of their extent (i.e. are at least partially contiguous) and more preferably are directly interconnected with each other.

The fibrous layer is preferably at least partially embedded in the conforming layer, and/or is at least partially embedded in the adhesive layer. Thus, the fibrous layer may be at least partially embedded in the conforming layer, in the adhesive layer or in both.

In an alternative aspect the invention relates to a marking tape for application on pavement. The marking tape comprises a core layer and an adhesive layer (preferably outside the core layer). The adhesive layer is adapted for retaining the marking tape on the pavement. Further the core layer is formed of a combination of a conforming layer of a, preferably non bituminous, thermoplastic material, and a marking layer of a cross-linked material. The conforming layer and the marking layer are preferably at least partially contiguous and/or are directly interconnected with each other. Such a marking tape preferably is free of a fibrous layer.

In a further alternative aspect, the invention provides a marking tape for application on pavement, the marking tape comprising a core layer and an adhesive layer; wherein the adhesive layer is adapted for retaining the marking tape on the pavement; and the core layer being formed of a combination of a conforming layer of a thermoplastic material, a marking layer of a cross-linked material, and a netting layer; wherein the conforming layer and the marking layer are in contact over at least a portion of their extent (i.e. are at least partially contiguous) and wherein the netting layer is at least partially embedded in the conforming layer and/or the adhesive layer.

The invention is advantageous in that it preferably provides for a marking tape having a relatively small thickness and having relatively high durability. The invention further allows for a so-called cold application of marking tape. Additionally it has been found that in response of traffic rolling over the tape the thermoplastic layer provides potential to gradually plastically conform to irregularities in the pavement after application of the marking tape, and thus may build up mechanical engagement with the pavement in use of the tape. Consequently the shear strength of the interconnection between the pavement and the marking tape may increase with increasing traffic rolling over the tape. Such self-adapting shear strength may help in maximizing traffic security because the marking tape may reliably stay in place. On the other hand marking tape which is intended for temporary use may remain easily removable over a certain period of time in which the conforming layer has conformed only to a limited extent. Further the invention is advantageous in that it provides for a relatively dimensionally stable marking tape. The marking tape of the invention further may be relatively inexpensive and lightweight.

In one embodiment the marking tape is a temporary marking tape. Such a temporary marking tape is preferably adapted for removable placement on a road surface, like for example used in a construction work zone. Thereby the marking tape is preferably removable by pulling the tape off from the road surface. Thus the road surface may not be adversely affected by removal of the tape. Further this may be achieved by use of relatively inexpensive equipment. This is in contrast to grinding the tape or marking off which in some case might damage the road surface. Further in contrast to removing tape by use of a high pressure water jet or grinding device the marking tape of the invention may not require comparatively expensive equipment for removal from the road.

In an alternative embodiment the marking tape is a permanent marking tape. Such a permanent marking tape is preferably adapted for fixedly retaining on the road surface. Typically such a permanent marking tape cannot be pulled off from the road surface easily and typically tears upon attempting pulling it off from the road surface.

In a preferred embodiment the fibrous layer comprises a netting layer. The fibrous layer may, in addition, comprise a nonwoven layer. In one embodiment fibrous layer comprises a netting layer and a nonwoven layer. The netting layer and the nonwoven layer may be laminated or otherwise fixed with each other to form a composite netting/nonwoven fibrous layer.

The nonwoven layer may comprise a spunbond or a melt blown nonwoven. The fibers which form the nonwoven layer may be made of polyethylene terephthalate (PET), polypropylene (PP), polyethylene (PE), polyamide (PA) or another suitable polymer. The nonwoven layer may have a particular area weight selected from a range of about 6 g/m$^2$ to about 150 g/m$^2$, most preferable from a range of about 15 g/m$^2$ to about 80 g/m$^2$.

In a further embodiment the conforming layer is at least partially arranged between the netting layer and the nonwoven layer. In particular the netting layer and the nonwoven layer may be at least partially embedded within the conforming layer.

In one embodiment a predominant part of the netting layer with respect to its thickness in a plane perpendicular to the tape length is embedded within the conforming layer, and the remaining part protrudes over the conforming layer. In this embodiment the nonwoven layer may be entirely or partially embedded in the conforming layer with respect to its thickness in a plane perpendicular to the tape length. Alternatively this embodiment may only have a netting layer, for example may not comprise a nonwoven layer.

In one embodiment a part, a predominant part or the whole of the netting layer with respect to its thickness in a plane perpendicular to the tape length may be embedded within the adhesive layer, and the remaining part (if any) may protrude outside the adhesive layer. In this embodiment a part or the whole of the remaining part (if any) of the netting layer (which protrudes outside the adhesive layer) may be embedded in the conforming layer.

In a further embodiment a predominant part of the nonwoven layer or the entire nonwoven layer with respect to its thickness in a plane perpendicular to the tape length is embedded within the conforming layer, and the remaining part, if present, protrudes over the conforming layer. This embodiment may only have a nonwoven layer, for example may not comprise a netting layer.

In one embodiment the thermoplastic material is a thermoplastic elastomer (TPE) having both, thermoplastic and elastomeric properties. The thermoplastic material may be selected from among at least one of styrenic block copolymers, polyolefin and blends thereof, elastomeric alloys (TPE-v or TPV), thermoplastic polyurethanes, thermoplastic copolyesters and thermoplastic polyamides. The thermoplastic material may further comprise combinations thereof. In another embodiment the conforming layer is a thermoplastic material with conforming properties and may or may not contain suitable amount of fillers or master batches based on above mentioned resin types.

Examples of commercially available TPE products are known under the designation Arnitel® (from the company DSM N.V.), Engage™ (Dow Chemical), Hytrel® (Du Pont), Lotryl (Arkema) Dryflex® and Mediprene® (ELASTO Ltd.), and Kraton™ (Kraton). TPU elastomers are commercially available under trade-names like Elastollan from BASF, Estane from Lubrizol and Desmopan from Bayer Material Science.

Further exemplary thermoplastic materials are listed in the examples under A1 to A24 below.

In a preferred embodiment the thermoplastic material contains polar functional groups or elements. The presence of such polar functional groups or elements preferably provides for a good adhesion with a further material, in particular with the material the marking layer is made of and/or with the material the adhesive layer is made of. Functional groups for the purpose of this specification incorporate for example ester, ether, urethane, ketone, carbonyl, aldehyde, alcohol or carbon acid or similar.

Preferably, in one embodiment, the thermoplastic material may comprise a mixture of two or more thermoplastic materials, for example a polyolefin and a polyurethane.

More preferably, the thermoplastic material may comprise a mixture of two or more polyolefins.

The marking tape may have an extruded thickness in the range 10 µm to 1000 µm, preferably 100 µm to 700 µm, more preferably 150 µm to 450 µm. Generally, the whole marking tape will have a thickness in the range 1 to 2 mm.

Preferably, the marking tape, with the fibrous layer removed, may have an E modulus in the range 10 to 140 N/mm$^2$, preferably 20 to 90 N/mm$^2$, more preferably 30 to 80 N/mm$^2$, and most preferably 30 to 60 N/mm$^2$. If the E modulus is too high then conformation properties are reduced. If the E modulus is too low the material is likely to be too easily removed, in use.

Preferably, the marking tape, with the fibrous layer removed, may have an inelastic deformation of 5% or higher, preferably of 10% or higher. The marking tape, with the fibrous layer removed, may have an inelastic deformation in the range 5% to 100%, preferably 10 to 80%, or 10% to 60%, more preferably 10 to 25% and most preferably 10 to 20%.

In the most preferred embodiments, the marking tape, with the fibrous layer removed, may have both an E modulus in the range 10 to 140 N/mm$^2$, preferably 20 to 90 N/mm$^2$, more preferably 30 to 80 N/mm$^2$, and most preferably 30 to 60 N/mm$^2$ and respectively an inelastic deformation in the ranges discussed above.

In a further embodiment the cross-linked material is selected from at least one of a polyurethane, epoxy, (meth)acrylate, acrylic, phenol or another material containing chemical reactive groups, including combinations thereof. Thermosetting polymers are preferred.

In one embodiment the marking layer may be formed of a polyurethane which comprises polar chains. Thus the polar chains of the polyurethane and the polar functional groups or elements of the thermoplastic material may interact and/or interlace with each other. Accordingly an excellent bond between the conforming layer and the marking layer may be achieved. The interconnection may be further reinforced by the nonwoven layer which may additionally bridge the interconnection.

In one embodiment the adhesive layer comprises a pressure sensitive adhesive (PSA). The pressure sensitive adhesive may be selected such that it allows for the marking tape to be pressed against a roadway for adhering it removably thereto. Different types of adhesives may be employed, both chemical and mechanical types. Pressure sensitive adhesives are typically and preferably aggressively and permanently tacky at room temperature, adhere to substrates without the need for more than hand pressure, and require no activation by water, solvent or heat. Suitable pressure-sensitive adhesives include rubber-resin adhesives as taught in Freeman, U.S. Pat. No. 3,451,537, and acrylate copolymers as taught in Ulrich, U.S. Pat. No. Re. 24,906.

Pressure sensitive adhesives useful in the present invention include non-tackified rubber adhesives, tackified rubber adhesives, such as natural rubber, olefins, silicones, polyisoprene, polybutadiene, polyurethanes, styrene-isoprene-styrene, and styrene-butadiene-styrene block copolymers, and other related eleastomers; and tackified or untackified acrylic adhesives such as copolymers which can be polymerized by radiation, solution, suspension, or emulsion techniques. Crosslinked adhesives are preferred, especially those pressure-sensitive adhesives crosslinked to provide high shear strength. A pressure sensitive adhesive may further be selected from hot melts or heat activated adhesives that are pressure sensitive at least at the time of application. In a particular embodiment the pressure sensitive adhesive may be based on an acrylic polymer. Particularly useful pressure sensitive adhesives may include acrylic polymers comprising repeating units of one or more alkyl (meth)acrylates of which the alkyl group has from 1 to 20 carbon atoms, for example 4 to 12 carbon atoms. Examples of alkyl (meth)acrylate monomers that may be used include isobornyl (meth)acrylate, ethyl(meth)acrylate, butyl(meth)acrylate, iso-octyl (meth)acrylate, 2-ethylhexyl (meth)acrylate and the like. The acrylic polymer may contain co-monomers including polar co-monomers such as ethylenically unsaturated acid monomers including for example (meth)acrylic acid and itaconic acid. The present invention may also include a stretch release pavement marking tape. Suitable adhesives may be those described in WO92/11333. The adhesive layer is preferably arranged on the conforming layer, in particular directly on the conforming layer. A part of the netting layer protruding from the conforming layer may be embedded in the adhesive layer. This may help maximizing the shear strength of the interconnection between the conforming layer and the adhesive layer. The adhesive layer may be covered by a removable liner. The liner may prevent different portions of the marking tape wound on a roll to stick together and thus may facilitate unwinding. The skilled person will however recognize the liner is optional.

In one embodiment the marking tape further comprises a multiplicity of reflective and/or retroreflective elements. The marking tape may for example comprise a multiplicity of retroreflective micro beads.

The marking tape may further comprise an anti-skid material. Such an anti-skid material may comprise a multiplicity of granules having sharp edges which protrude over a surface of the marking layer. The marking tape may thus help maximizing safety in use of the tape in traffic.

In one embodiment the marking tape is provided with a color pigment, for example yellow or white. The color pigment may be provided in the marking layer and/or the conforming layer. In one embodiment the marking tape may have a generally clear, for example transparent or translucent, marking layer and a conforming layer which comprises the color pigment.

In a further embodiment the marking tape further is coated with a silicone on one or both sides, for example on the marking layer. This may hinder tape portions from adhering with other tape portions during storage in a roll and during unwinding from the roll.

Generally the marking layer preferably forms an outside layer of the marking tape (eventually coated with silicone) and the adhesive layer preferably forms an opposite further outside layer (eventually covered by a removable liner). The conforming layer is preferably arranged between the marking layer and the adhesive layer.

In one embodiment the marking tape comprises a generally flat or a structured surface. The structured surface may be formed by a multiplicity of protrusions protruding from a surface of the marking tape. For example the conforming layer may form a multiplicity of bulges or studs on its surface which are at least partially covered or coated by the marking layer. For example the marking layer may cover only the end of the protrusions or the end and lateral faces of the protrusions. Further the marking layer may cover the overall structured surface of the conforming layer in the form of a layer of a generally uniform thickness. A structured marking tape may provide for maximizing the durability, in particular maximizing the durability of retroreflective properties. For example although the protrusions may be abraded partially over time reflective elements arranged on lateral surfaces of the protrusions may still provide for retroreflectivity of the tape.

In a further aspect the invention relates to a method of applying a marking tape on pavement. The method comprises the steps of:
providing a marking tape of any of the preceding claims which comprises a conforming layer of a thermoplastic material and an adhesive layer;
placing a portion of the tape oriented with the adhesive layer on the pavement; and
pressing the portion of the tape on the pavement while maintaining the marking tape at a temperature within a range of about −20° C. to about 60° C. preferably 10° C. to about 50° C.

In one example the method of applying a marking tape on pavement comprises the step of providing a primer on the road surface. The primer preferably is adapted to bind dirt, dust or other particles on the road surface and further is preferably adapted to interact with the adhesive layer of the marking tape. Thus a good bond of the marking tape on the road surface may be achieved.

In still a further aspect the invention relates to a method of manufacturing a marking tape. The method comprises the steps of:
providing thermoplastic material, a cross-linkable material, a fibrous layer, and an adhesive;
merging the thermoplastic material, the cross-linkable material, the fibrous layer, and the adhesive to form a marking tape according to the invention.

In one embodiment the method comprises the step of extruding the thermoplastic material to form a conforming layer. The thermoplastic material may be an extrudate of a single thermoplastic material or a coextrudate of two or more different thermoplastic materials. Preferably the step of extruding the thermoplastic material comprises extruding the thermoplastic material through a flat film die. The so extruded flat film may be guided through at least one pair of rollers. One or both rollers optionally have a structured surface to provide the conforming layer with a structured surface. The extruded film may further be calendered to a desired thickness.

In one embodiment the method comprises the step of providing a netting layer. The method may further comprise the step of combining the netting layer and the conforming layer. Such combination may be provided by jointly hot laminating the netting layer and the conforming layer. This preferably causes the netting layer to at least partially embed in the conforming layer. Alternatively, the combination may be provided by using an adhesive to adhere the netting layer and the conforming layer.

In a further embodiment the method comprises the step of providing a nonwoven layer. The method may further comprise the step of combining the nonwoven layer and the conforming layer. Such combination may be provided by jointly hot laminating the nonwoven layer and the conforming layer. This preferably causes the nonwoven layer to at least partially embed in the conforming layer. Alternatively, the combination may be provided by using an adhesive to adhere the nonwoven layer and the conforming layer.

In a further embodiment, the method comprises the steps of providing the non-woven layer, the netting layer, and the conforming layer, and combining these three layers. The combination may be provided by hot calendering the three layers. For example the conforming layer maybe arranged on a combination of the netting layer and the nonwoven layer and the non woven layer may only be partially embedded in the conforming layer.

In still a further embodiment the method comprises the step of providing a nonwoven layer and a netting layer for forming, in combination, the fibrous layer. The method may further comprise the step of combining the nonwoven layer, the netting layer and the conforming layer. Thereby the netting layer and the nonwoven layer may be arranged on the conforming layer on opposite sides. The combination may be provided by jointly hot laminating the nonwoven layer, the netting layer and the conforming layer. This preferably causes the nonwoven and/or netting layer to at least partially embed in the conforming layer. In a further embodiment the method further comprises the step of arranging a second conforming layer on the first conforming layer with one of the nonwoven layer and the netting layer arranged between. The method may further comprise the step of arranging a third conforming layer on the first conforming layer with the other one of the nonwoven layer and the netting layer arranged between. Thus a sandwich of three conforming layers may be formed with each of the nonwoven layer and the netting layer being enclosed between two of the three conforming layers.

The method may further comprise the steps of:
running the nonwoven layer over a first roller and the netting layer over a second roller;
providing the thermoplastic material between the nonwoven layer and the netting layer, and thereby forming a conforming layer;
pressing the nonwoven-layer, the thermoplastic material and the netting layer between the first and second rollers. The pressing may be performed by involvement of laminating and/or calendering.

In one embodiment the method comprises the steps of providing a cross-linkable material, and coating the cross-linkable material onto the conforming layer. In particular the method may comprise the step of coating the cross-linkable material on the netting layer and/or the nonwoven layer arranged on the conforming layer.

In one embodiment the method comprises the step of coextruding the conforming layer from at least two thermoplastic materials that may be the same or different. Accordingly the method may comprise the step of coextruding one or multiple layers with at least two optionally different thermoplastic materials to form the conforming layer. At least one of thermoplastic materials preferably has polar functional groups or elements. Thus a conforming layer may be provided which is adapted for bonding with a cross-linkable or cross-linked material of a marking layer. Alternatively the at least two optionally different thermoplastic materials may be extruded individually and merged as long as the materials have not entirely hardened. Such merging may be performed by jointly running the extruded materials through a pair of rollers or through a calender. Further the at least two optionally different thermoplastic materials may be extruded individually, cooled to harden, and subsequently may be merged by calendering. Thereby the two optionally different thermoplastic materials may be re-heated by the calender for merging.

In one embodiment the method comprises the step of coating the cross-linkable material on the conforming layer. The cross-linkable material may be coated in a generally liquid form onto the conforming layer. Preferably the cross-linkable material is coated on the nonwoven side (if present) of the conforming layer. The method may further comprise the step of depositing a multiplicity of reflective elements and optionally anti-skid particles onto the non-hardened cross-linkable material. The method may still further comprise the step of hardening the cross-linkable material.

DETAILED DESCRIPTION OF THE INVENTION

Figure 1:
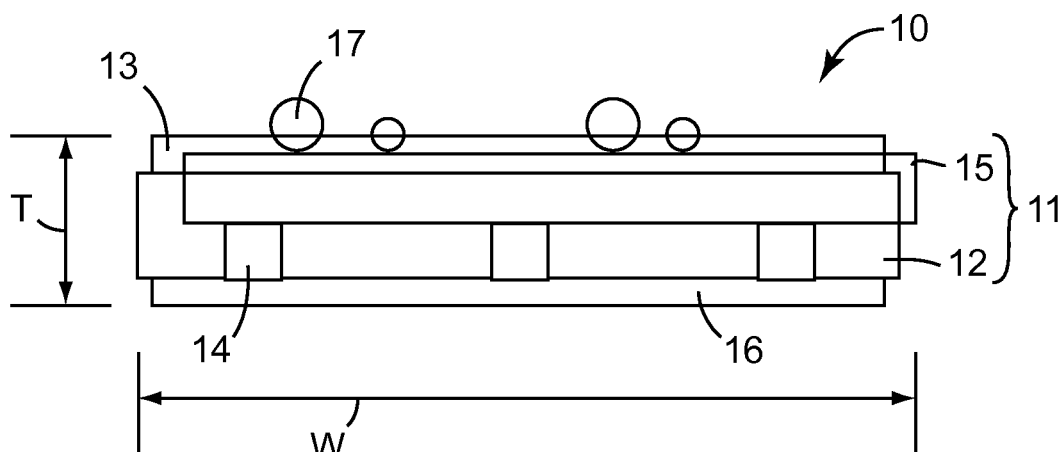
FIGS. 1 to 5 are cross-sectional views of marking tapes according to various embodiments of the invention.

FIG. 1 shows a cross-section of a marking tape 10. The cross-section shown in the Figure relates to a cross-section in a plane perpendicular to a length or longitudinal dimension of the tape. The marking tape has a thickness T and a width W laterally to the longitudinal dimension. The thickness typically refers a dimension of the tape generally perpendicular to a surface on which the tape may be applied, for example the dimension in which the tape protrudes from that surface when applied thereto. The dimensions of other structures of the marking tape are referred to herein as "length", "width" and "thickness" accordingly.

The marking tape has a core layer 11 which comprises a conforming layer 12 and a marking layer 13. The conforming layer 12 in the example consists of a thermoplastic material as defined in this specification. Further the marking layer 13 in the example consists of a cross-linked material as defined in this specification. A netting layer 14 and a nonwoven layer 15 are embedded within the core layer 11. In particular the netting layer 14 is embedded in the conforming layer 12. Preferably in more particular the netting layer 14 is arranged outside the marking layer 13. Further the netting layer 14 may be predominantly embedded within the conforming layer 12 and may partially protrude from a boundary of the conforming layer 12 in a dimension of the tape thickness T. The marking tape 10 further has an adhesive layer 16 for retaining the marking tape on a surface, for example a surface of pavement or a road surface. The marking tape further may have a liner (not shown) which covers the adhesive layer 16. The adhesive layer 16 is arranged on the core layer 11, in particular on the side of the core layer carrying the conforming layer 12. The part of the netting layer 14 which protrudes over the conforming layer 12 preferably is embedded within the adhesive layer. Thus the shear strength of the bond between the conforming layer 12 and the adhesive layer 16 may be maximized. A shear load to the tape may for example be caused by a vehicle over-rolling the tape, in particular along a curve or during increasing or reducing speed.

The marking layer 13 and the conforming layer in the example are directly interconnected with each other. For example the interconnection may not comprise any additional adhesive or other bonding material. The nonwoven layer 15 in the example is partly embedded within the conforming layer 12 and additionally partly embedded in the marking layer 13. Thus also the shear strength of the bond between the conforming layer 12 and the marking layer 13 may be maximized. In this embodiment the nonwoven layer 15 and the netting layer 14 in combination form a fibrous layer, and that fibrous layer extends over the interconnection of the marking layer 13 with the conforming layer 12 as well over the interconnection of the conforming layer 12 with the adhesive layer 16. It has been found that thus a relatively durable marking tape construction is formed.

The marking tape in the example further has a multiplicity of reflective elements 17. In the example the reflective elements comprise glass beads as defined in this specification which are at least partially embedded within the marking layer 13. During manufacturing of the marking tape the nonwoven layer may form a support for the reflective elements 17.

For example the marking tape shown may be obtained by pre-manufacturing the conforming layer including the netting layer 14 and the nonwoven layer 15 to form a precursor of the core layer 11. Such a core layer precursor has a side from which a part of the nonwoven layer 15 protrudes from the conforming layer 12, and the protruding part of the nonwoven layer is preferably not saturated by the thermoplastic material. A cross-linkable material for forming the marking layer 13 may be subsequently coated on the nonwoven side of this core layer precursor and saturate the protruding part of the nonwoven layer 15. Reflective elements 17 may be deposited into the still non-hardened cross-linkable material. Thereby the nonwoven layer preferably limits the sinking of reflective elements 17 into the soft cross-linkable material so that the reflective elements 17 finally protrude from the marking layer to a predetermined extent and therefore provide the marking tape with a reflective or retroreflective property.

Further the thickness of the coating may be selected such that only a few layers or substantially a single layer of reflective elements are sufficient to provide the marking tape 10 with reflective or retroreflective properties. On the other hand although only a relatively thin portion of the marking layer comprises reflective elements the marking layer may be maximized in thickness because the other portion of the marking layer extends into the nonwoven layer. This allows for maximizing the thickness of the marking layer independent from the amount of reflective elements needed and without use of a multilayer construction for the marking layer. This may be advantageous in that a maximized marking layer may help in providing a maximized strength and opacity. At the same time the amount of reflective elements may be minimized.

Figure 2:
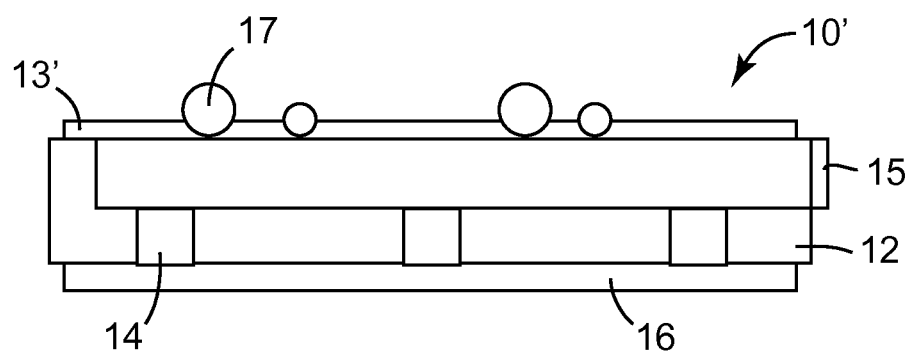

FIG. 2 shows a marking tape 10' which is identical to the marking tape 10 of FIG. 1 except that the nonwoven layer 15 is predominantly or entirely embedded within the conforming layer. In this example consequently the marking layer 13' may be thinner than the marking layer 13 in FIG. 1 because the thickness of the nonwoven layer 15 available for receiving cross-linkable material for forming the marking layer is reduced relative to the example in FIG. 1. The so formed marking tape may be minimized in thickness and thus for example allow for a maximized amount to be supplied on a roll. However in another example the marking layer may be obtained by an alternative manufacturing method and thus may have any desired thickness (although not shown).

Figure 3:
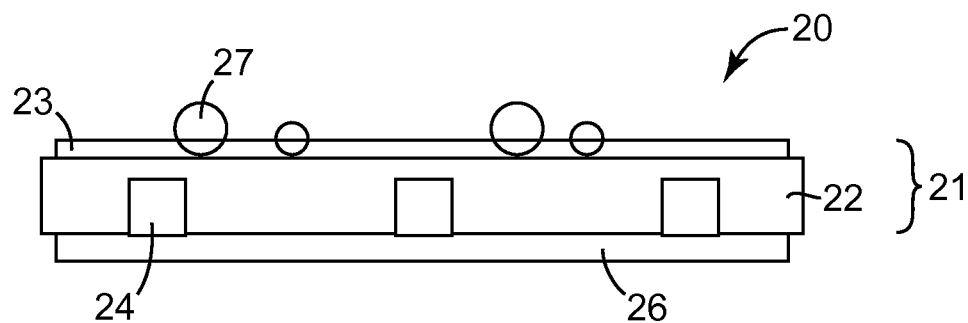

FIG. 3 shows a cross-section of a marking tape 20. The marking tape 20 has a core layer 21 comprising a conforming layer 22 and a marking layer 23. Again the conforming layer 22 in the example consists of a thermoplastic material as defined in this specification, and the marking layer 23 in the example consists of a cross-linked material as defined in this specification. A netting layer 24 is embedded within the core layer 21. In particular the netting layer 24 is embedded in the conforming layer 22, and in more particular the netting layer 24 is preferably arranged outside the marking layer 23. The netting layer 24 may be predominantly embedded within the conforming layer 12 and may partially protrude from a boundary of the conforming layer 22 in a dimension of the tape thickness. The marking tape 20 further has an adhesive layer 26. A liner (not shown) may cover the adhesive layer 26. The adhesive layer 26 is arranged on the side of the core layer 21 which carries the conforming layer 22. The part of the netting layer 24 which protrudes over the conforming layer 22 preferably is embedded within the adhesive layer 26. Further the marking layer 23 and the conforming layer 22 in the example are directly interconnected with each other.

The marking tape in the example further has a multiplicity of reflective elements 27. In the example the reflective elements comprise glass beads as defined in this specification which are at least partially embedded within the marking layer 23. During manufacturing of the marking tape the conforming layer 22 may form a support for the reflective elements 17. The example shown does not comprise a nonwoven layer but only netting layer 24. In this embodiment the netting layer 24 forms a fibrous layer.

Figure 4:
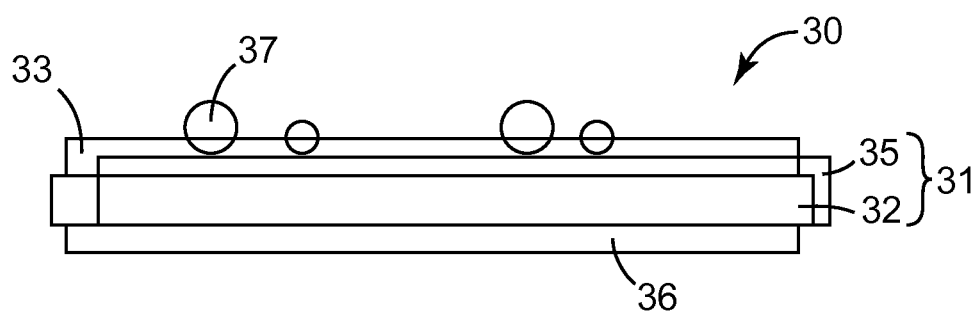

FIG. 4 shows a cross-section of a marking tape 30. The marking tape has a core layer 31 which comprises a conforming layer 32 and a marking layer 33. The conforming layer 32 in the example consists of a thermoplastic material as defined in this specification. Further the marking layer 33 in the example consists of a cross-linked material as defined in this specification. The marking tape 30 further has an adhesive layer 36 for retaining the marking tape 30 on a surface. The adhesive layer 36 is arranged on the conforming layer 32.

The marking layer 33 and the conforming layer 32 in the example are directly interconnected with each other. The nonwoven layer 35 in the example is partly embedded within the conforming layer 32 and additionally partly embedded in the marking layer 33. Thus the shear strength of the bond between the conforming layer 32 and the marking layer 33 may be maximized. The example shown does not comprise a netting layer but only nonwoven layer 35. In this embodiment the nonwoven layer 35 forms a fibrous layer.

The marking tape in the example further has a multiplicity of reflective elements 37 and optionally skids. In the example the reflective elements comprise glass beads which are at least partially embedded within the marking layer 33. During manufacturing of the marking tape the nonwoven layer may form a support for the reflective elements 37 as described above.

Figure 5:
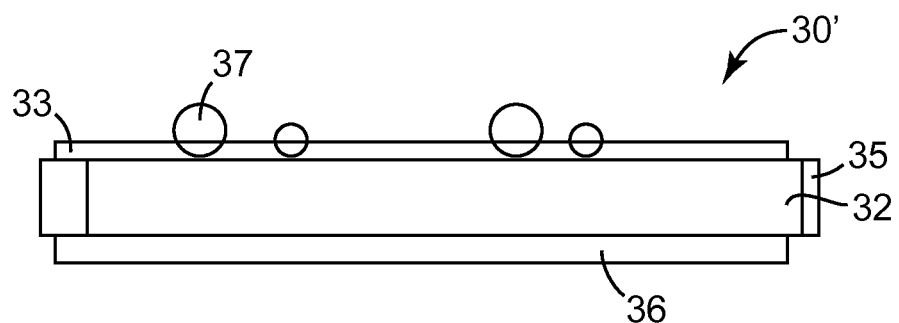

FIG. 5 shows a marking tape 30' which is identical to the marking tape shown in FIG. 4 except that the non-woven layer is entirely embedded within the conforming layer 32. This may provide for a marking layer having a minimized thickness as outlined in example of FIG. 2.

Figure 6:
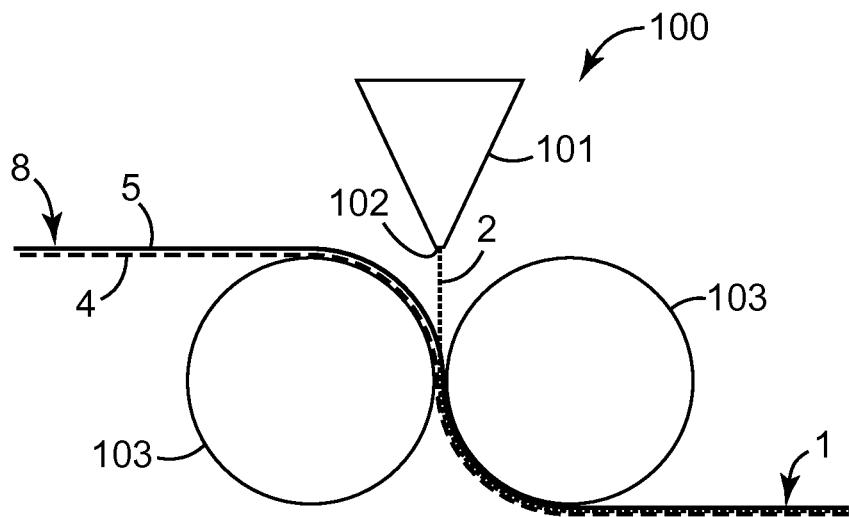
FIG. 6 is a schematic view illustrating a method of manufacturing a part of a marking tape according to the invention.

FIG. 6 illustrates a method of manufacturing at least part of a marking tape according to the invention. The example shows a manufacturing line 100 comprising an extruder 101 equipped with a flat film die 102, and a pair of rollers 103 which are arranged at a predetermined distance relative to each other to form a predetermined clearance between. Optionally the rollers have a structured surface (not shown) for providing raised and/or recessed structures on the marking tape. A nonwoven layer 5 and a netting layer 4 are provided between the rollers 103. However the skilled person will recognize that in an alternative example only a netting layer 4 or a non-woven layer 5 may be used with the method illustrated in the example. In the example shown the nonwoven layer 5 and the netting layer 4 are jointly provided from generally the same direction and guided on the entry side of the pair of rollers over only one of the rollers 103. The jointly supplied nonwoven layer 5 and the netting layer 4 together form a precursor 8 of a fibrous layer. Further a thermoplastic material 2 is extruded from the extruder 101 and guided between the pair of rollers 103 along with the fibrous layer precursor 8. In the example shown the fibrous layer precursor 8 and the extruded thermoplastic material 2 are guided such that the netting layer 4 runs between the nonwoven layer 5 and the thermoplastic material 2. The thermoplastic material 2 and the fibrous layer precursor 8 are merged between the rollers 103. In the example shown the soft thermoplastic material 2 extruded from the extruder 101 is urged by the rollers 103 to penetrate the fibrous layer precursor 8. In particular the thermoplastic material 2 penetrates the fibrous layer precursor 8 in a direction from the netting layer 4 toward the nonwoven layer 5. Accordingly the method may be controlled such that thermoplastic material 2 saturates the netting layer 4 entirely and the nonwoven layer 5 partly or entirely. The degree of saturation of the nonwoven layer 5 may particularly be adjustable. For example the temperature of the thermoplastic material 2 and the distance of the rollers 103 to each other may be selected such that the netting layer 4 gets entirely saturated by the thermoplastic material 2, whereas the nonwoven layer 5 gets only partially saturated by the thermoplastic material 2. Although not illustrated a so formed precursor 1 of a core layer 1 may be subsequently coated by cross-linkable material, provided with reflective elements and an adhesive layer added to form a marking tape according to the invention.

Figure 7:
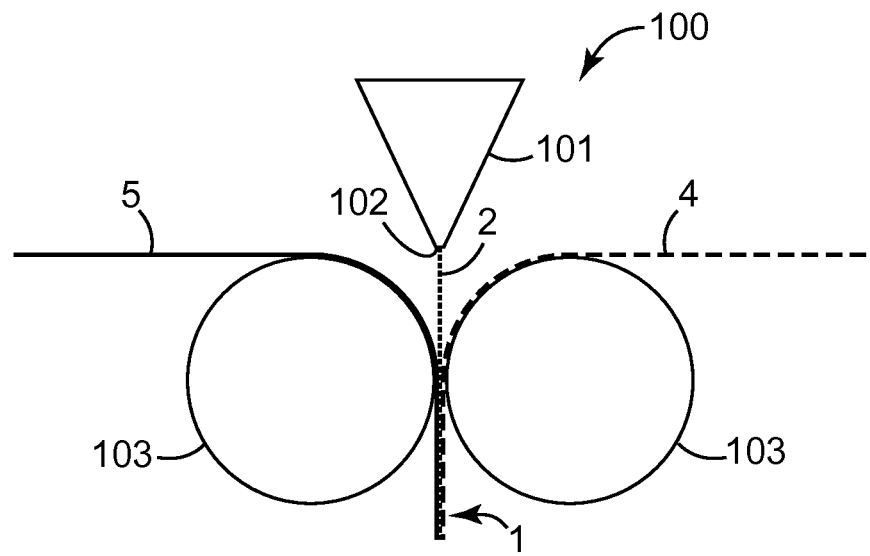
FIG. 7 is a schematic view illustrating a further method of manufacturing a part of a marking tape according to the invention.

FIG. 7 illustrates an alternative method of manufacturing at least part of a marking tape according to the invention. The example shows the same manufacturing line 100 as shown in FIG. 6. A nonwoven layer 5 and a netting layer 4 are provided between the rollers 103. In the example shown the nonwoven layer 5 and the netting layer 4 are provided separately from each other from generally opposite directions. The nonwoven layer 5 is guided over one of the rolls of the rollers 103 and the netting layer 4 is guided over the other one of the rollers 103 on the entry side of the pair of rollers 103. The thermoplastic material 2 is extruded from the extruder 101 and guided between the nonwoven layer 5 and the netting layer 4. The thermoplastic material 2 and the nonwoven layer 5 and netting layer 4 are merged between the rollers 103. In the example the soft thermoplastic material 2 extruded from the extruder 101 and the nonwoven layer 5 and netting layer 4 are urged toward each other by the rollers 103 so that the thermoplastic material 2 penetrates the netting layer 4 as well as the nonwoven layer 5. The netting layer 4 may have larger open cells than the nonwoven layer 5 and thus may establish a lower resistance against saturation by thermoplastic material 2 than the nonwoven layer 5. Accordingly the thermoplastic material 2 may saturate the netting layer 4 to a greater extent than the nonwoven layer 5. A so formed precursor 1 of a core layer may for example be used to provide a marking tape as shown in FIG. 1.

Figure 8:
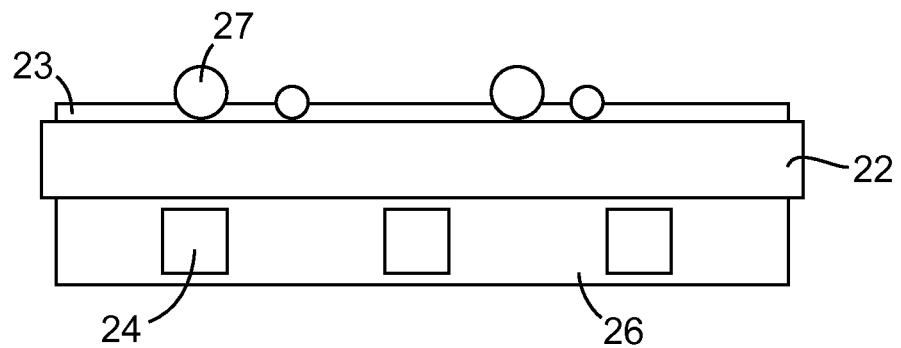
FIG. 8 is a cross sectional view of a marking tape according to a further embodiment of the invention.

FIG. 8 shows a marking tape which is similar to the marking shown in FIG. 3 except that the netting layer 24 is outside of the conforming layer 22 and is embedded within the adhesive layer 26.

Figure 9:
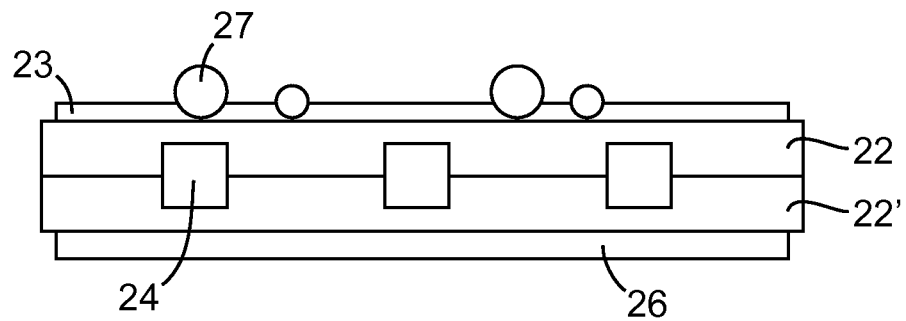
FIG. 9 is a cross sectional view of a marking tape according to a yet further embodiment of the invention.

FIG. 9 shows a marking tape which is similar to that shown in FIG. 3, except that the conforming layer comprises two, co-extruded sub conforming layers 22 and 22'. The netting is encapsulated (i.e. embedded) between the two sub conforming layers 22 and 22'.

Figure 10:
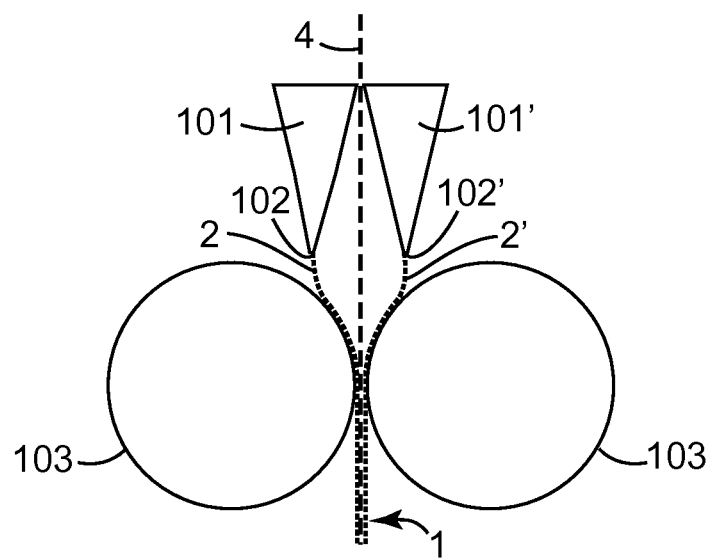
FIG. 10 is a schematic view illustrating a further method of manufacturing a part of a marking tape according to FIG. 9.

FIG. 10 illustrates a method of manufacturing at least part of a marking tape according to FIG. 9. The example shows two extruders 101 each equipped with a flat film die 102, and a pair of rollers 103 which are arranged at a predetermined distance relative to each other to form a predetermined clearance between. Optionally the rollers have a structured surface (not shown) for providing raised and/or recessed structures on the marking tape. A fibrous layer consisting only of a netting layer 4 is provided between the rollers 103. However the skilled person will recognize that in an alternative example a fibrous layer consisting of either a nonwoven layer 5 only or both a netting layer 4 and a nonwoven layer 5 may be used with the method illustrated in the example. In the example shown the netting layer 4 is provided from generally the same direction and guided on the entry side of the pair of rollers centrally between the two rollers 103. Further a thermoplastic material 2 is extruded from one of the extruders 101 and a thermoplastic material 2' is extruded from the other extruder 101 and guided between the pair of rollers 103 on either side of the netting layer 4. The thermoplastic materials 2 and 2' may be the same or different. In the example shown the thermoplastic materials 2 and 2' are extruded on either side of the netting layer 4 which is therefore embedded between them.

Although not illustrated a so formed precursor 1 of a core layer 1 may be subsequently coated by cross-linkable material, provided with reflective elements and an adhesive layer added to form a marking tape according to the invention.

Other examples may comprise other variations of the methods described by way of example only. In one example the thermoplastic material may be extruded in the form of two or more strands of thermoplastic material and combined with the netting layer and/or the nonwoven layer. For example two extruded strands of thermoplastic material may be run between the nonwoven layer and the netting layer. One of the extruded films may in one example entirely saturate the nonwoven layer and the other film may entirely or partially saturate the netting layer. In such examples the thermoplastic material may be coextruded or individually extruded and merged before merging with further layers.

In another example the thermoplastic material may be extruded and cooled to form a thermoplastic film which subsequently may be laminated or calendered with the netting layer and/or nonwoven layer to form a core layer precursor. Such core layer precursor may then be coated with the cross-linkable material.

In any of the examples described individual extruded layers or merged layers may be calendered to provide the marking tape or precursors of it with a desired and precise thickness.

EXAMPLES

The following list A1-A10 describes the thermoplastic raw materials and fillers used to extrude and/or co-extrude the conforming layer.

A1. Thermoplastic Polyurethane elastomer—Elastolan™ 1185 A—available from BASF; polyether based; elongation 600%; tensile strength 45 MPa; MFI (190° C./2.16 kg) 30 g/10 min.; extruded as film with a thickness of 50-1000 µm, preferably 100-700 µm, most preferably 150-450 µm.

A2. Thermoplastic olefin elastomer—Engage™ 8411—available from Dow Chemical; ethane-octene elastomer; elongation 1000%; tensile strength 7.3 MPa; MFI (190° C./2.16 kg) 18 g/10 min.; extruded as film with a thickness of 50-1000 µm, preferably 100-700 µm, most preferably 150-450 µm.

A3. Thermoplastic olefin elastomer—Infuse™ 9817—available from Dow Chemical; ethane-octene block co-polymer; elongation 1540%; tensile strength 2.4 MPa; MFI (190° C./2.16 kg) 15 g/10 min.; extruded as film with a thickness of 50-1000 µm, preferably 100-700 µm, most preferably 150-450 µm.

A4. Thermoplastic olefin elastomer—Infuse™ 9530—available from Dow Chemical; ethane-octene block co-polymer; elongation 1000%; tensile strength 7.4 MPa; MFI (190° C./2.16 kg) 5 g/10 min.; extruded as film with a thickness of 50-1000 µm, preferably 100-700 µm, most preferably 150-450 µm.

A5. Functional polyolefin copolymer Lotryl™ 24 MA005—available from Arkema; Random copolymer of ethylene and methyl acrylate; elongation 750%; tensile strength 17 MPa; MFI (190° C./2.16 kg) 0.4-0.6 g/10 min.; extruded as film with a thickness of 50-1000 µm, preferably 100-700 µm, most preferably 150-450 µm.

A6. Functional polyolefin copolymer Lotryl™ 20 MA08—available from Arkema; Random copolymer of ethylene and methyl acrylate; elongation 800%; tensile strength 9 MPa; MFI (190° C./2.16 kg) 7-9 g/10 min; extruded as film with a thickness of 50-1000 µm, preferably 100-700 µm, most preferably 150-450 µm.

A7. Coextruded film of a functional polyolefin copolymer Lotryl™ 24 MA005—available from Arkema; Random copolymer of ethylene and methyl acrylate; elongation 750%; tensile strength 17 MPa; MFI (190° C./2.16 kg) 0.4-0.6 g/10 min. and a functional maleic anhydride grafted polymer—available under the trade name Amplify GR216 supplied by Dow Chemical; MFI (190° C./2.16 kg) 1.3 g/10 min.; elongation 1000%; tensile strength 8.96 MPa; coextruded film with a thickness of 50-1000 µm, preferably 100-700 µm, most preferably 150-450 µm whereas the Amplify GR216 layer comprises 5%-70% of the total extruded film thickness, preferably 10%-50%. Depending on the number of layers amount maybe higher.

A8. Coextruded film of a low density polyethylene resin Dow LDPE 150E available from Dow Chemical; and a functional maleic anhydride grafted polymer—available under the trade name Amplify GR216 supplied by Dow Chemical; MFI (190° C./2.16 kg) 1.3 g/10 min.; elongation 1000%; tensile strength 8.96 MPa; coextruded film with a thickness of 50-1000 µm, preferably 100-700 µm, most preferably 150-450 µm whereas the Amplify GR216 layer comprises 5%-70% of the total extruded film thickness, preferably 10%-50%. Depending on the number of layers amount maybe higher.

A9. Thermoplastic co-polyester, high molecular weight, slightly crystalline available from Evonik Degussa GmbH under the trade name of Dynacoll™ S 1401, S1402, S EP1408 and similar grades. Film coated via heated laboratory knife coater with a thickness of 50-1000 µm, preferably 100-700 µm, most preferably 150-450 µm between two siliconized paper liners.

A10. Functional maleic anhydride grafted polymer—available under the trade name Amplify GR216 supplied by Dow Chemical; MFI (190° C./2.16 kg) 1.3 g/10 min.; elongation 1000%; tensile strength 8.96 MPa; extruded as film with a thickness of 50-1000 µm, preferably 100-700 µm, most preferably 150-450 µm.

The thicknesses specified for the materials A1 to A10 refer to flat or non-structured types of marking tape. For structured marking tapes greater thicknesses are preferably used.

The following listings B1-B4 and C1 to C2 refer to exemplary fibrous materials (nonwoven and netting):
B1. Mogul, Turkey; spunbond 17 gsm
B2. Johns Manville, Germany; JM 478-25 spunbond 25 g/m²
B3. Johns Manville, Germany; JM 568-40 spunbond 40 g/m²
B4. Johns Manville, Germany; JM688-80 spunbond 80 g/m²
C1. Highland Industries, USA; Polyester scrim; Weight: 45 g/m².
C2. Dotex Wirkwaren GmbH, Germany; Polyester scrim; Weight 40 g/m².

The following table 1 refers to a formulation of a polyurethane material D as it may be used for an exemplary marking layer. Although the compositions and/or components listed in the table (as elsewhere in this specification) are available as different grades or types available from different suppliers, various of these different compositions and/or components seem to be likewise suitable for use with the present invention. The preferred thickness of such a layer or layers is within a range of about 50 µm to 500 µm, for example provided by coating.

TABLE 1

| Generic raw material name | Molecular weight | Composition |
|---|---|---|
| Polyol 1 | 300 | 12.5 |
| Polyol 2 | 900 | 6 |
| Polyol 3 | 930 | 1 |
| Filler | | 7 |
| Additive package | | 3 |
| Catalyst | | 0.02 |
| Pigment | | 16.5 |
| Solvent | | 4 |
| Aliphatic polyisocyanate | 191 (equivalent weight) | 50 |

The following listing E1 to E3 refers to reflective elements as they may be used with the present invention.
E1. 1.5 index glass beads with a size distribution of about 600 µm to about 1300 µm
E2. Corundum with a size distribution of about 500 µm to about 2000 µm
E3. 3M Reflective Elements (sandcore beads as disclosed in patent document US 2008/0280034)

Examples 1 to 3

A marking tape was manufactured by sequential coating/lamination using a laboratory knife coater heated to about 140° C. The tape was manufactured by the following steps:
Coating of a layer of thermoplastic elastomer of the type A9 between two silicone coated liners to form a conforming layer between the liners;
placing a spunbond nonwoven of the type B4 between the conforming layer and one of the liners;
laminating the spunbond nonwoven and the conforming layer to embed the spunbond nonwoven in the conforming layer by use of a hand roller;
in Examples 1 and 2: placing a netting layer of the C1 on the side of the conforming layer opposite of the spunbond nonwoven;
in Examples 1 and 2: laminating the netting layer and the conforming layer to embed the netting layer in the conforming layer by use of a hand roller;
coating of a 250 µm polyurethane marking layer D on the conforming layer on the side of the spunbond nonwoven using the knife coater;
coating of beads, skids and eventually further reflective elements onto the polyurethane marking layer;
curing of the polyurethane marking layer in a ventilated oven for about 10 minutes at 120° C.
Lamination of an adhesive on the side opposite of the polyurethane marking layer.

For making the conforming layer the knife coater was set to a coating gap of typically 100 µm to 150 µm and the coater was heated up to a temperature of 140° C. Prior to the coating operation the thermoplastic elastomer was molten in a ventilated oven.

Materials used (see Table 2 and the following particular materials):
conforming layer (Example 1): Dynapol S-1201
conforming layer (Example 2): Dynapol S-1202
conforming layer (Example 3): Dynapol EP1408

Examples 4-14

A marking tape was manufactured by extruding the conforming layer to the fibrous layer and/or netting layer using an extruder or respectively coextruder. The construction was completed by coating a 250 µm polyurethane marking layer on the side of the spunbond nonwoven (if present) using a knife coater followed by depositing the beads, skids and further reflective elements onto the polyurethane marking layer and curing the obtained marking tape in a ventilated oven for about 10 minutes at 120° C.

Following table shows a list of examples conducted in accordance with the present invention.

TABLE 2

| Construction | Example 4 | Example 5 | Example 6 | Example 7 | Example 8 | Example 9 | Example 10 | Example 11 | Example 12 | Example 13 | Example 14 | Comparative Example |
|---|---|---|---|---|---|---|---|---|---|---|---|---|
| Conforming layer | A9 | A9 | A9 | A5 | A7 | A7 | A1 | A1 | A1 | A3 | A4 | NBR rubber based premix |
| Nonwoven layer | B4 | B4 | B4 | B4 | B4 | B4 | — | B4 | B4 | B4 | B4 | — |
| Netting layer | C1 | C2 | — | C1 | — | C1 | C1 | — | C1 | — | — | C2 |
| Marking layer | D | D | D | D | D | D | D | — | D | — | — | D |

TABLE 2-continued

| Construction | Example 4 | Example 5 | Example 6 | Example 7 | Example 8 | Example 9 | Example 10 | Example 11 | Example 12 | Example 13 | Example 14 | Comparative Example |
|---|---|---|---|---|---|---|---|---|---|---|---|---|
| Reflective elements | E1-E3 | E1-E3 | E1-E3 | E1-E3 | — | E1-E3 | — | — | E1-E3 | — | — | E1-E3 |
| Adhesive layer | acrylic PSA | acrylic PSA | acrylic PSA | acrylic PSA | acrylic PSA | acrylic PSA | acrylic PSA | acrylic PSA | acrylic PSA | acrylic PSA | acrylic PSA | acrylic PSA |
| Tear Strength in N | 45 | 45 | 32 | — | 30 | — | 39 | 29 | 49 | 21 | 26 | 45 |

Comparative Example

A combination of a conforming layer made of NBR rubber premix and a netting layer was provided. A polyurethane marking layer was coated on the NBR premix conforming layer.

Test

The tear strength was measured on Examples 4 to 14 and on the Comparative Example. The test results are given in Table 2.

Test Method for Tear Strength

The tear resistance test was performed according to DIN 53356 or ASTM 1004. Samples of film having the dimensions of 100 mm×50 mm were cut from the extruded film in both the machine direction (MD) and crossweb (CD) directions, respectively. The film thickness varied between 0.3 mm and 0.5 mm. Film thickness was measured and used in the calculation.

A 50 mm cut was made in the edge of the film along the length of samples as described in the test method. The two partially connected strips produced by the cut were gripped in the jaws of the tensile tester and pulled in opposite directions at a crosshead speed of 100 mm/min.

The force required to tear the film in a manner representing an extension of the cut was recorded in N.

Examples 15 to 24

These Examples were produced using the method as described, above for examples 4 to 14. The additional materials used in Examples 15 to 24 are as follows:

A11. Thermoplastic Polyurethane—Desmopan™ 786E—available from Bayer AG polyether based; elongation 544%; tensile strength 39 MPa; shore hardness A 87; extruded as film with a thickness of 50-1000 µm, preferably 100-700 µm, most preferably 150-450 µm.

A12. Thermoplastic olefin elastomer—Engage™ 8411—available from Dow Chemical ethane-octene elastomer; elongation 900%; tensile strength 6.5 MPa; MFI (190° C./2.16 kg) 18 g/10 min.; extruded as film with a thickness of 50-1000 µm, preferably 100-700 µm, most preferably 150-450 µm.

A13. Thermoplastic olefin elastomer—Infuse™ 9807—available from Dow Chemical ethane-octene block co-polymer; elongation 1200%; tensile strength 3 MPa; MFI (190° C./2.16 kg) 15 g/10 min.; extruded as film with a thickness of 50-1000 µm, preferably 100-700 µm, most preferably 150-450 µm.

A14. Functional polyolefin copolymer—Lotryl™ 20 MA08—available from Arkema Random copolymer of ethylene and methyl acrylate; elongation 800%; tensile strength 10 MPa; MFI (190° C./2.16 kg) 8 g/10 min.; extruded as film with a thickness of 50-1000 µm, preferably 100-700 µm, most preferably 150-450 µm.

A15. Advanced polyolefin—Hifax™ CA10A—available from LyondellBasell Polymers Reactor TPO, elongation 500%; tensile strength 11 MPa; MFI (190° C./2.16 kg) 0.6 g/10 min.; extruded as film with a thickness of 50-1000 µm, preferably 100-700 µm, most preferably 150-450 µm.

A16. Advanced polyolefin—Hifax™ CA12A—available from LyondellBasell Polymers elongation 500%; tensile strength 9 MPa; MFI (190° C./2.16 kg) 0.8 g/10 min.; extruded as film with a thickness of 50-1000 µm, preferably 100-700 µm, most preferably 150-450 µm.

A17. Octene-1 LLDPE—Stamylex 1066F—available from Dex Plastomers octene based linear low density polyethylene, elongation 1270%; tensile strength 19 MPa; MFI (190° C./2.16 kg) 6.6 dg/min.; extruded as film with a thickness of 50-1000 µm, preferably 100-700 µm, most preferably 150-450 µm.

A18. APAO—Vestoplast™ 828—available from Evonic Industries AG amorphous polyalphaolefin, elongation 550%; tensile strength 1 MPa; extruded as film with a thickness of 50-1000 µm, preferably 100-700 µm, most preferably 150-450 µm.

A19. Polybond™ 3009—available from Chemtura Manufacturing Maleic anhydride modified high density polyethylene; MFI (190° C./2.16 kg) 3-6 g/10 min A20. Apyral™ 24—available from Nabaltec Mineral flame retardant; Al (OH)$_3$—Content 99.7%;

A21. Glass bubbles K37—available from 3M Deutschland GmbH; Isostatic crush strength 3000 psi; True density 0.37 g/cm$^3$; average diameter 45 microns A22. Kronos™ 2190—available from Kronos; rutile pigment with TiO$_2$ content>93%; density 4.1 g/cm$^3$ A23. Omyalene™ M112-OG—available from Omya; Calcium Carbonate Masterbatch; MFI (190° C./2.16 kg) 10 g/10 min; density 2.1-2.2 g/cm$^3$ A24. Pigmented granulated master batches—Alcolor™ PSGelb A41-035—available from Albis Plastic GmbH; based on an easy-flow polystyrene Test Methods The E-modulus [N/mm$^2$] and the inelastic deformation [%] were measured on extruded Examples 15 to 24 and on the Comparative Example. The measured samples had no Netting- and/or Nonwoven layer so that a direct comparison could be made of the properties of the layers. The test results are given in Table 3.

The E-modulus referred to in this specification was measured according to EN ISO 527-1. Samples of conforming layer having dimension of 25.4×140 mm were cut from the extruded film in cross web direction. Film thickness was measured and entered in the measurement software.

Samples were clamped in the machine with a jaw distance of 100 mm. Measurement of the E-modulus was performed on a Tensile Tester.

The ID referred to in this specification was measured according to DIN 53377. Samples of conforming layer having the dimension of 25.4×140 mm were cut from the extruded film in cross web direction. The samples were clamped in the Tensile Tester with a jaw distance of 100 mm. The film was stretched to the length of 120 mm. Calculation of the ID is ID=($L_{ID}$−100/20)×100 [%] with $L_{ID}$ to be the length of the specimen including the unrecovered deformation after 15 min.

TABLE 3

| Construction | #15 | #16 | #17 | #18 | #19 | #20 | #21 | #22 | #23 | #24 | Comparative Example |
|---|---|---|---|---|---|---|---|---|---|---|---|
| Reflective elements | E1-E3 | E1-E3 | E1-E3 | E1-E3 | E1-E3 | E1-E3 | E1-E3 | E1-E3 | E1-E3 | E1-E3 | E1-E3 |
| Marking layer | D | D | D | D | D | D | D | D | D | D | D |
| Conforming layer | 60% A15 25% A18 10% A3 | 75% A11 20% A14 | 38% A16 7% A15 19% A18 1% A19 | 35% A16 14% A15 25% A18 1% A19 | 73.7% A18 | 77% A11 | 10% A15 67% A18 | 50% A11 50% A3 | 50% A15 40% A18 10% A3 | 45% A16 18% A15 27% A18 1% A19 | NBR rubber based premix |
| Filler | 5% A23 | 5% A20 | 35% A23 | 25% A23 | 26.3% A21 | 33% A21 | 23% A18 | — | — | 9% A21 | — |
| Nonwoven layer | — | — | B2 | — | — | — | — | — | — | — | — |
| Netting layer | C1 | C1 | C1 | C1 | C1 | C1 | C1 | C1 | C1 | C1 | C2 |
| Adhesive layer | PSA | PSA | PSA | PSA | PSA | PSA | PSA | PSA | PSA | PSA | PSA |
| E-module of conforming layer [N/mm²] | 29 | 44 | 138 | 64 | 12 | 80 | 20 | 21 | 28 | 86 | 15.4 |
| Inelastic deformation of conforming layer [%] | 10 | 15 | 32 | 20 | 23 | 7 | 18 | 12 | 12 | 28 | 30 |

The invention claimed is:

1. A marking tape for application on pavement, comprising:
    a core layer and an adhesive layer;
    wherein the adhesive layer is adapted for retaining the marking tape on the pavement; and
    the core layer comprises a conforming layer of a thermoplastic material, a marking layer of a cross-linked material, and a fibrous layer; wherein the fibrous layer comprises a nonwoven layer and a netting layer, wherein the netting layer is separate from the nonwoven layer;
    wherein the conforming layer and the marking layer are at least partially contiguous and/or directly interconnected with each other;
    wherein the nonwoven layer is partially embedded in the conforming layer and in contact with the marking layer;
    wherein the netting layer is imbedded within the conforming layer and is in contact with the adhesive layer,
    wherein the netting layer and the nonwoven layers are in contact with each other;
    wherein the conforming layer is at least partially arranged between the netting layer and the nonwoven layer.

2. The marking tape of claim 1, wherein the marking tape is a temporary marking tape.

3. The marking tape of claim 1, wherein the thermoplastic material is selected from the group consisting of a styrenic block copolymer, polyolefin, polyolefin blend, elastomeric alloy, thermoplastic polyurethane, thermoplastic copolyester, thermoplastic polyamide, or a combination thereof.

4. The marking tape of claim 1, wherein the thermoplastic material comprises a mixture of two or more thermoplastic materials.

5. The marking tape of claim 1, wherein the thermoplastic material comprises a mixture of two or more polyolefins.

6. The marking tape of claim 1, wherein the marking tape has a thickness in the range 10 μm to 1000 μm.

7. The marking tape of claim 1, wherein the marking tape, with the fibrous layer removed, has an E modulus in the range 10 to 140 N/mm².

8. The marking tape of claim 1, wherein the cross-linked material is selected from the group consisting of a polyurethane, epoxy, (meth)acrylate, acrylic, phenol or a combination thereof.

9. The marking tape of claim 1, wherein the adhesive layer comprises a pressure sensitive adhesive selected from the group consisting of untackified natural rubber, tackified natural rubber, olefins, silicones, polyisoprene, polybutadiene, polyurethanes, styrene-isoprene-styrene, and styrene-butadiene-styrene block copolymers, styrene-ethylene-butylene-styrene, styrene-ethylene-propene-styrene, or tackified or untackified acrylic adhesives and copolymers thereof including acidic groups.

10. The marking tape of claim 1, further comprising a multiplicity of reflective elements.

11. The marking tape of claim 1, comprising a generally flat or a structured surface, and wherein the structured surface is formed by a multiplicity of protrusions protruding from the marking tape.

12. The marking tape of claim 1, wherein the nonwoven layer protrudes from the conforming layer into the marking layer.

\* \* \* \* \*

UNITED STATES PATENT AND TRADEMARK OFFICE
CERTIFICATE OF CORRECTION

| | | |
|---|---|---|
| PATENT NO. | : 11,110,695 B2 | Page 1 of 1 |
| APPLICATION NO. | : 14/404265 | |
| DATED | : September 7, 2021 | |
| INVENTOR(S) | : Jean Le Normand et al. | |

It is certified that error appears in the above-identified patent and that said Letters Patent is hereby corrected as shown below:

In the Claims

<u>Column 19</u>
Line 60, In Claim 1, delete "imbedded" and insert -- embedded --, therefor.

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*